United States Patent
Gredler et al.

(10) Patent No.: US 10,430,098 B2
(45) Date of Patent: Oct. 1, 2019

(54) SYSTEM AND METHODS FOR DEFINING OBJECT MEMORY FORMAT IN MEMORY AND STORE FOR OBJECT INTERACTIONS, MANIPULATION, AND EXCHANGE IN DISTRIBUTED NETWORK DEVICES

(71) Applicant: RtBrick Inc., Princeton, NJ (US)

(72) Inventors: Hannes Gredler, Pillberg (AT); Santosh Pallagatti Kotrabasappa, Bangalore (IN); Deepak J, Bangalore (IN); Pravin S. Bhandarkar, Bangalore (IN)

(73) Assignee: RTBRICK, INC., Princeton, NJ (US)

( * ) Notice: Subject to any disclaimer, the term of this patent is extended or adjusted under 35 U.S.C. 154(b) by 97 days.

(21) Appl. No.: 15/644,139

(22) Filed: Jul. 7, 2017

(65) Prior Publication Data

US 2018/0011655 A1 Jan. 11, 2018

Related U.S. Application Data

(60) Provisional application No. 62/359,775, filed on Jul. 8, 2016.

(51) Int. Cl.
*G06F 3/06* (2006.01)
*G06F 16/25* (2019.01)
*G06F 16/22* (2019.01)
*G06F 16/27* (2019.01)

(52) U.S. Cl.
CPC .......... *G06F 3/0638* (2013.01); *G06F 3/0604* (2013.01); *G06F 3/067* (2013.01); *G06F 16/22* (2019.01); *G06F 16/2282* (2019.01); *G06F 16/252* (2019.01); *G06F 16/27* (2019.01)

(58) Field of Classification Search
CPC ...... G06F 3/0638; G06F 3/0604; G06F 3/067; G06F 17/30312; G06F 17/30575; G06F 17/30339; G06F 17/3056; G06F 16/27; G06F 16/22; G06F 16/2282; G06F 16/252
See application file for complete search history.

(56) References Cited

U.S. PATENT DOCUMENTS

| | | | | |
|---|---|---|---|---|
| 9,378,149 | B1* | 6/2016 | Bonwick | G06F 12/0246 |
| 2010/0332475 | A1* | 12/2010 | Birdwell | G06F 17/30333 |
| | | | | 707/737 |
| 2012/0265762 | A1* | 10/2012 | Wade | G06Q 50/184 |
| | | | | 707/741 |
| 2013/0036115 | A1* | 2/2013 | Schwarz | G06F 17/30309 |
| | | | | 707/736 |
| 2015/0193526 | A1* | 7/2015 | Gaur | G06F 17/3033 |
| | | | | 707/747 |

* cited by examiner

*Primary Examiner* — Hiep T Nguyen
(74) *Attorney, Agent, or Firm* — Foley & Lardner LLP

(57) ABSTRACT

Systems and methods of the present disclosure are directed to defining a data store format for storing state information related to border-gateway protocol (BGP) routing information base (RIB) entries, BGP Neighbor Tables, intermediate system-intermediate system (IS-IS) adjacencies, Link-State Databases, Interface information, Chassis information, etc in a binary format. A brick data store (BDS) system can define tables, table properties, objects and attributes for an application in the system using configuration files expressed in Java Script Object Notation (JSON). The data format can be uniform across inter-process communication, file and in-memory representation.

20 Claims, 20 Drawing Sheets

```
"table": {

"type": "bgp.neighbor",
    "object": "bgp.neighbor-entry",

"map": {
        "type": "diff-map",
        "max" : 1,
    },

"index": [
    {
        "name": "peer-nrt-index",
        "type": "radix",
        "immutable":true,
        "key": [ "peer-nrt-index" ]
    },
    {
        "name": "peer-ipv4-index",
        "type": "radix",
        "key": [ "peer-ipv4-address" ]
    },
    {
        "name": "peer-ipv6-index",
        "type": "radix",
        "key": [ "peer-ipv6-address" ]
    }
    ]
}
```

| Length | Type |
| --- | --- |
| Sequence number | |
| Offset count | S | U | D | AML | Variable Attribute Mask |
| Variable offset list | |
| Variable data list | |

FIGURE 4

| Length | | | |
|---|---|---|---|
| Element count | Type | | |
| S | | | |
| Variable offset list | | | |
| Variable data list | | | |

FIGURE 5

| Table | | |
|---|---|---|
| Seg root | Root 1 | Root 2 |

FIGURE 6

SYSTEM AND METHODS FOR DEFINING OBJECT MEMORY FORMAT IN MEMORY AND STORE FOR OBJECT INTERACTIONS, MANIPULATION, AND EXCHANGE IN DISTRIBUTED NETWORK DEVICES

FIELD OF THE DISCLOSURE

The present disclosure is generally directed to networking. In particular, the present disclosure describes techniques for in-memory representation, manipulation, and exchange of objects related to distributed networking devices.

BACKGROUND OF THE DISCLOSURE

Distributed networking can utilize a plurality of nodes interconnected by a network to exchange and process networking information. Different nodes in the distributed networking system can employ different techniques for representation and manipulation of networking information, resulting in increased complexity.

BRIEF SUMMARY OF THE DISCLOSURE

In a brick-data-store (BDS) in-memory database based system (hereinafter referred to as "the BDS system"), state information relating to border-gateway protocol (BGP) routing information base (RIB) entries, BGP Neighbor Tables, intermediate system-intermediate system (IS-IS) adjacencies, Link-State Databases, Interface information, Chassis information, etc., is retained in an in-memory database. Brick Data Store Format (BDSF) is utilized for object representation in memory and in the BDS database. All state transactions are handled via the database like a SQL database (tables, objects, attributes, etc.).

The BDS system provides a unified memory layout that significantly reduces the complexity of per application logic to serialize and de-serialize information. The BDS system also provides a strong abstraction in the infrastructure which allows a suite of utilities to be built around BDSF for usage by end user applications. This capability reduces the per application complexity and allows application developers to focus on the application logic built on a framework of uniform object format with utilities and exchange facilities.

In some embodiments, tables, table properties, objects and attributes for an application in the system can be defined using configuration files expressed in Java Script Object Notation (JSON), which enables easy specification of dynamic objects. The BDSF representation of data is uniform across inter-process communications, file, and in-memory representation. This allows easy uniform access for information in memory and during processing.

The BDS system can define an object table, an object container and an attribute binary format that uniquely represents the information in the system across inter-process communication, in-memory database, and the file system. The BDS system further provides uniform representation of objects in the system along with the ability for the applications to interpret and use the information with serialization and de-serialization of information. This significantly reduces the code used in each module to read and create information across the system. The object format is a binary format with sufficient interpretation information to lend itself to be organized using object tables or databases that improve the ability to capture the system state. In some embodiments, the BDS system allows efficient memory layout of the object map coupled with index map that allows an instance to be indexed into multiple flavor of lookup trees with incremental extra information. In some embodiments, the system state can be archived on off-board servers with large storage capacity, which coupled with temporal ordering of information can help view and replay state at all times on the system. In some embodiments, the BDS system provides object consistency across object tables leveraging a modified version of IS-IS routing protocol to ensure table synchronization. Providing object consistency can be critical in maintaining synchronization in loosely coupled systems such as those that utilize IS-IS routing protocols.

In some embodiments, the BDS system provides a bit compression technique to acknowledge objects in the table, which ensures tables are synchronized across modules. In some embodiments, the BDS system provides an efficient way of recovering the system from restart of a module with the help of a queue runner utility. The queue runner ensures that there is no need to maintain any timer handles or pointers. So it is easy to recover from a restart by utilizing a snapshot stored on hard disk. In some embodiments, the BDS system provides an efficient way to indicating add/delete or a delta change in object with plug-ins. Applications receive notifications about any operation on the table with the help of plug-ins registers. In some embodiments, a diff map application can be used as a tool to determine the state of the system at a given instant without overloading the memory. In some embodiments, the BDS system provides a unique way of storing indexes and its object map. For example, all the trees in the table can have one index and one object map. This can be beneficial with respect to memory foot print reduction as no tree will hold a separate pointer to data. In addition, separate pointers to key and for the trees index would be already in warm cache which ensures faster lookup.

In one aspect, a system for more efficiently storing objects in memory of an in-memory storage system includes an in-memory storage system comprising memory coupled to a processor. The system further includes a first location of memory having a first predetermined memory format configured to store content of an object and an object map, where the object map comprises an attribute mask and an offset list to locate a particular attribute of a plurality of attributes of the object, and where the attribute mask comprises a bit vector describing an encoding of the plurality of attributes of the object. The system also includes a second location of memory having a second predetermined memory format configured to store an index map of indexes to one or more objects. The index map includes an index to the object map for the object.

In some embodiments, the system further includes a table stored in a third location of memory having a third predetermined format. In some embodiments, the table is further configured to store at least one node comprising the index map. In some embodiments, the index map comprises a key and offset list for each node in the table. In some embodiments, the index map is further configured to provide a lookup of the object in the table while maintaining a pointer to the object map. In some embodiments, the first predetermined memory format is further configured to store a length field identifying a fixed length in bits of the first predetermined memory format.

In some embodiments, the first predetermined memory format is further configured to store one or more of the following fields for one of the object or object map: an attribute mask length indicating a number of bytes of the attribute mask, a sequence number indicating a version of the object, and an offset count indicating a number of offsets in the object. In some embodiments, data for the object is stored in binary format in the first predetermined memory format. In some embodiments, the system additionally includes a fourth location of memory having a fourth predetermined format configured to store a diff map associated with the object map, the diff map including a diff map attribute mask and a list of attributes, from the plurality of attributes of the object, that have been changed. In some embodiments, the system further includes a fifth location of memory having a fifth predetermined format configured to store diff map index map associated with the diff map, where the index map comprises indexes to the diff map. In some embodiments, the index map of indexes to one or more objects includes an index to the diff map index map. In some embodiments, the first predetermined memory format and the second predetermined memory format includes a Java Script Object Notation format. In some embodiments, the system also includes a sixth location of memory having a sixth predetermined memory format configured to encapsulate a message to another processor communicably coupled to the processor, the message including information of at least one of: replication of the object and table synchronization.

In one aspect, a computer readable storage medium having instructions stored thereon, which, when executed by a computer, cause the computer to execute a method for efficiently storing objects in memory of an in-memory storage system, the method includes storing content of an object and an object map at a first location of memory in an in-memory system in a first predetermined format, wherein the object map comprises an attribute mask and an offset list to locate a particular attribute of a plurality of attributes of the object, wherein the attribute mask comprises a bit vector describing an encoding of the plurality of attributes of the object. The method further includes storing an index map of indexes to one or more objects at a second location of memory in the in-memory system in a second predetermined memory format, wherein the index map comprises an index to the object map for the object.

In some embodiments, the method further includes storing a table in a third location of memory in the in-memory system in a third pre-determined format. In some embodiments, the method also includes storing at least one node comprising the index map in the table. In some embodiments, the method additionally includes providing a lookup of the object in the table while maintaining a pointer to the object map. In some embodiments, storing content of an object and an object map at a first location of memory in an in-memory system in a first predetermined format includes storing a length field identifying a fixed length in bits of the first predetermined memory format. In some embodiments, storing content of an object and an object map at a first location of memory in an in-memory system in a first predetermined format includes storing one or more of the following fields for one of the object or object map: attribute mask length indicating a number of bytes of the attribute mask, a sequence number indicating a version of the object, and an offset count indicating a number of offsets in the object. In some embodiments, storing content of an object and an object map at a first location of memory in an in-memory system in a first predetermined format includes storing data for the object in binary format.

In one aspect a system for more efficiently storing objects in memory of an in-memory storage system includes an object table, an object container, and an attribute binary format that uniquely represents the information in the system across Inter-Process Communication, In-memory database and a file system. The system includes uniform representation of object in the system with the ability of the applications to interpret and use the information with serialization and de-serialization of information that significantly reduces the code used in each module to read and create information across the system. In some embodiments, the object format is a binary format with sufficient interpretation information to organize this around object tables or data bases that effectively allow system state to be captured. The system includes efficient memory layout of the object map coupled with index map that allows an instance to be indexed into multiple flavor of lookup trees with incremental extra information. In some embodiments, the system state can be archived on off-board servers with large storage capacity; this coupled with temporal ordering of information can help view and replay state at all times on the system. In some embodiments, the system includes object consistency across object tables leveraging a modified version of intermediate system-intermediate system (ISIS) routing protocol to ensure table synchronization. In some embodiments, the system uses a bit compression technique to acknowledge objects in the table, which ensures tables are synchronized across modules. In some embodiments, the system provides an efficient way of recovering system from restart of a module with the help of a queue runner. With the queue runner there timer handles or pointers may not have to be maintained, thereby making it relatively easy to recover from a restart using a snapshot stored on a hard disk.

In some embodiments, the system indicates add/delete or a delta change in an object with plug-ins. Applications can receive notification about any operation on the table with the help of plug-ins registered via a publish-subscribe internal bus. In some embodiments, the system captures all system states in a database and make it accessible to an end-user as well as retains updates as deltas on top of an underlying model. In some embodiments, a diff map can be used as a tool to store a state of the system at a given instance without bloating up the memory. In some embodiments, the system stores indexes and its object map. All the trees in the table can have one index and one object map. This can reduce memory foot print as no tree may hold a separate pointer to the data. Further, this can provide faster table lookup as separate pointers to key and for the trees index would be already in a hot cache.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 2 illustrates one example representation of a table in a BDS system;

FIG. 3 illustrates one example representation of objects in a BDS system;

FIG. 4 shows an example BDS system memory format;

FIG. 5 illustrates an example Array Object Format defined by a BDS system;

FIG. 6 illustrates another example representation of a tables in a BDS system;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for a brick data store (BDS) in-memory database.

Section C describes embodiments of systems and methods for representation of tables and objects in the BDS database.

Section D describes embodiments of systems and methods for a BDS memory format utilized in the BDS database.

Section E describes embodiments of systems and methods for representation of tables and index mapping in the BDS database.

Section F describes embodiments of systems and methods for various utilities provided by the BDS database.

A. Computing and Network Environment

Figure 1A:
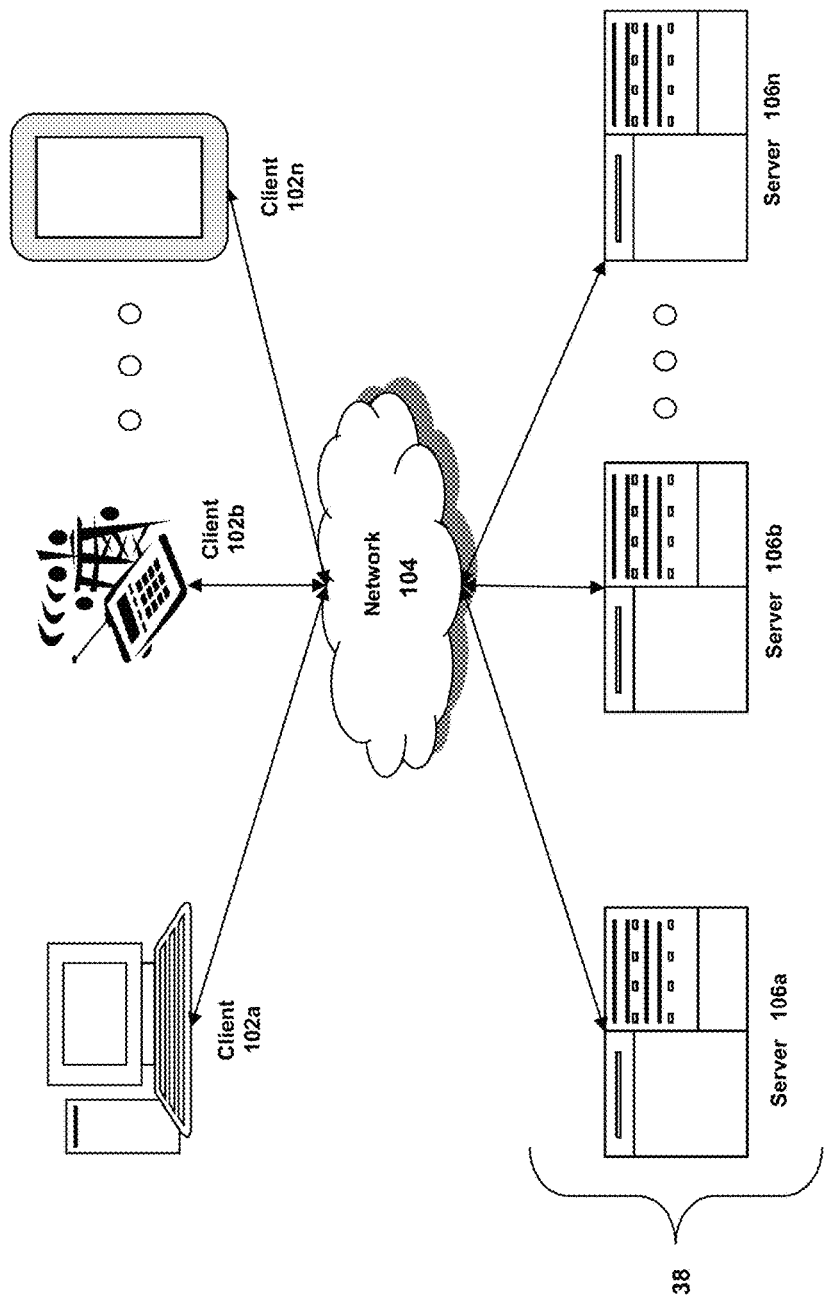
FIG. 1A is a block diagram depicting an embodiment of a network environment comprising a client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
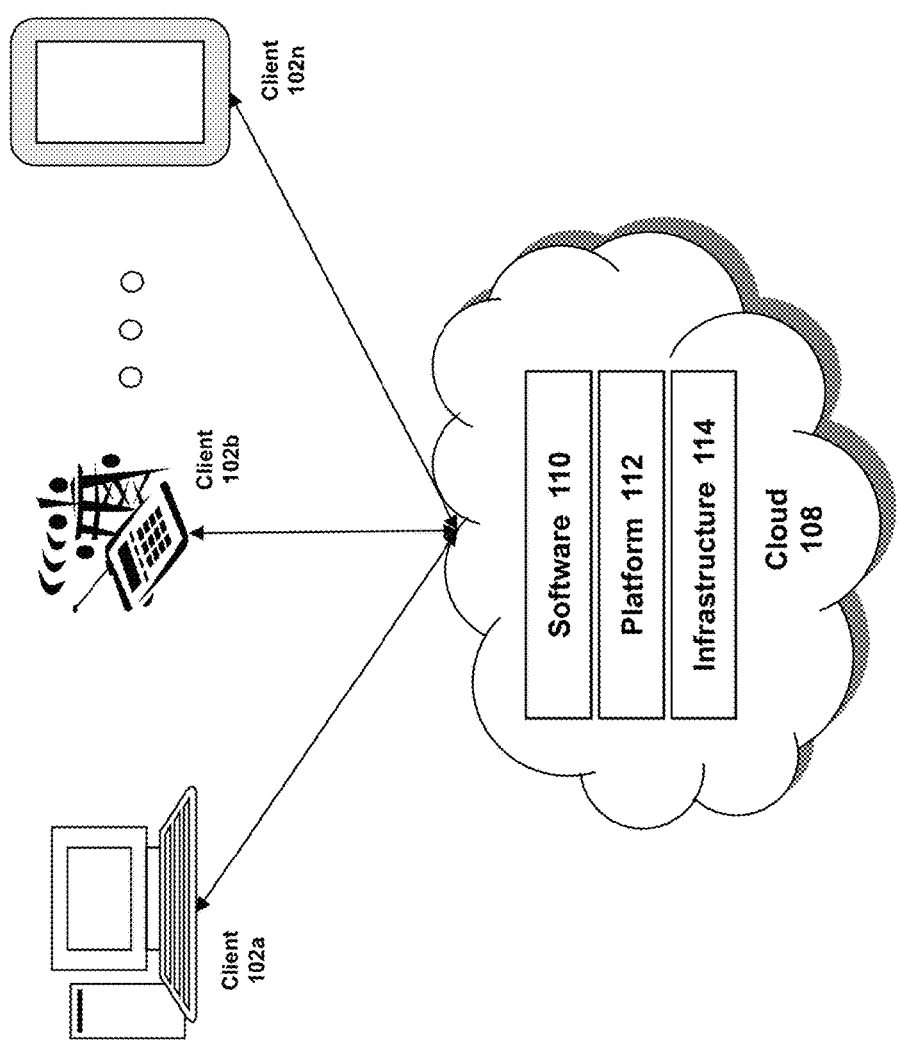
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
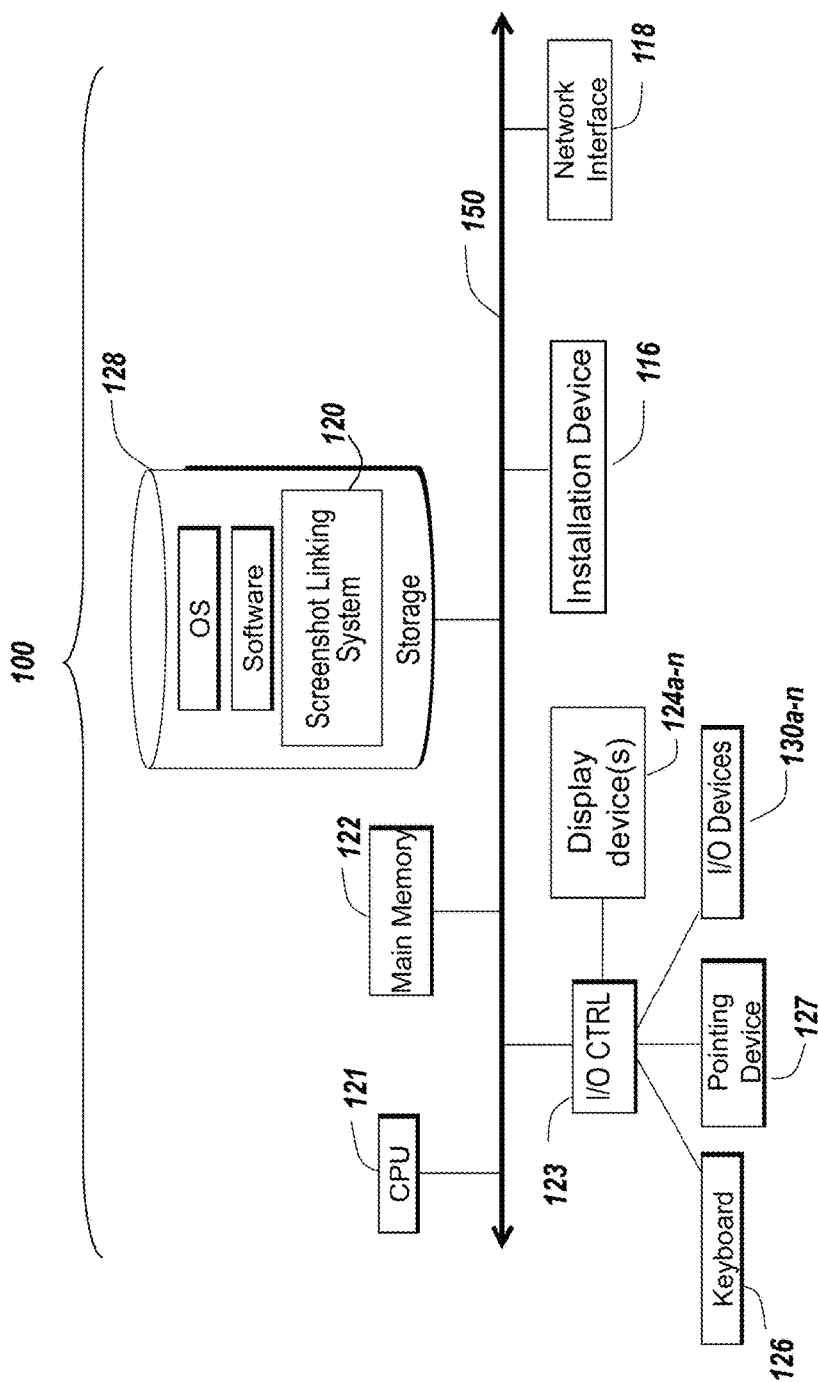
FIGS. 1C and 1D are block diagrams depicting embodiments of computing devices useful in connection with the methods and systems described herein.
Figure 1D:
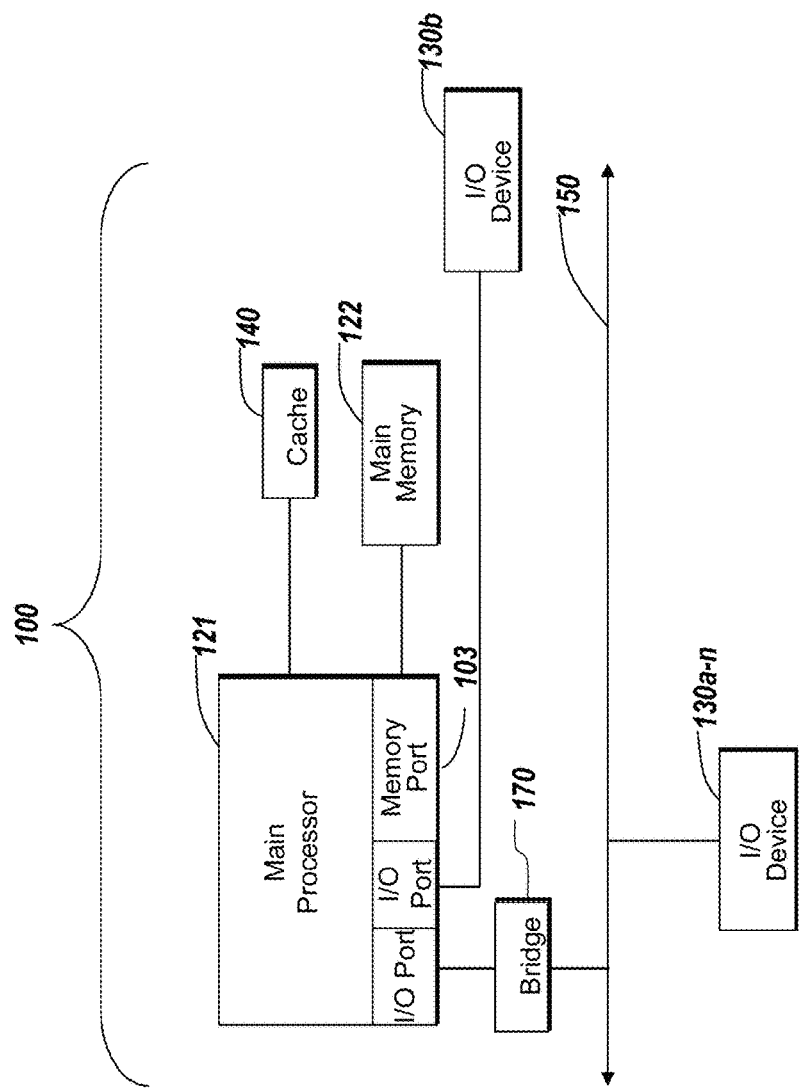

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a screenshot linking system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the screenshot linking system 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2022, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Brick Data Store (BDS) In-Memory Database

In a BDS in-memory database based system (hereinafter referred to as "the BDS system"), state information relating to border-gateway protocol (BGP) routing information base (RIB) entries, BGP Neighbor Tables, Intermediate System-Intermediate System (IS-IS) adjacencies, Link-State Databases, Interface information, Chassis information, etc., is retained in an in-memory database. A Brick Data Store Format (BDSF) is utilized for object representation in memory and in the BDS database. All state transactions are handled via the database like a SQL database (using e.g., tables, objects, attributes, etc.).

The BDS system provides a unified memory layout that significantly reduces the complexity of per application logic to serialize and de-serialize information. The BDS system also provides a strong abstraction in the infrastructure which allows a suite of utilities to be built around BDSF for usage by end user applications. This capability reduces the per application complexity and allows application developers to focus on the application logic built on a framework of uniform object format with utilities and exchange facilities.

In some embodiments, tables, table properties, objects and attributes for an application in the system can be defined using configuration files expressed in Java Script Object Notation (JSON), which enables easy specification of dynamic objects. The BDSF representation of data can be uniform across inter-process communications, file, and in-memory representation. This allows easy uniform access for information in memory and during processing.

The BDS system can define an object table, an object container and an attribute binary format that uniquely represents the information in the system across inter-process communication, in-memory database, and the file system. The BDS system further provides uniform representation of objects in the system along with the ability for the applications to interpret and use the information with serialization and de-serialization of information. This significantly reduces the code used in each module to read and create information across the system. The object format is a binary format with sufficient interpretation information to lend itself to be organized using object tables or databases that improve the ability to capture the system state. In some embodiments, the BDS system allows efficient memory layout of the object map coupled with index map that allows an instance to be indexed into multiple flavor of lookup trees with incremental extra information. In some embodiments, the system state can be archived on off-board servers with large storage capacity, which coupled with temporal ordering of information can help view and replay state at all times on the system. In some embodiments, the BDS system provides object consistency across object tables leveraging a modified version of IS-IS routing protocol to ensure table synchronization. Providing object consistency can be critical in maintaining synchronization in loosely coupled systems such as those that utilize IS-IS routing protocols.

In some embodiments, the BDS system provides a bit compression technique to acknowledge objects in the table, which ensures tables are synchronized across modules. In some embodiments, the BDS system provides an efficient way of recovering the system from restart of a module with the help of a queue runner utility. With a queue runner, there is no need to maintain any timer handles or pointers. Hence it is easy to recover from a restart by utilizing a snapshot stored on hard disk. In some embodiments, the BDS system provides an efficient way to indicating add/delete or a delta change in object with plug-ins. Applications receive notifications about any operation on the table with the help of plug-ins registers. In some embodiments, a diff map application can be used as a tool to determine the state of the system at a given instant without overloading the memory. In some embodiments, the BDS system provides a unique way of storing indexes and its object map. For example, all the trees in the table can have one index and one object map. This can be beneficial with respect to memory foot print reduction as no tree will hold a separate pointer to data. In addition, separate pointers to key and for the trees index would be already in warm cache which ensures faster lookup.

C. Representations of Tables and Objects in the BDS System

Table Representation

FIG. 2 illustrates one example representation of a table in the BDS system. In particular, FIG. 2 shows a table "bgp-.neighbor" expressed in the java script object notation (JSON). The table includes an object type: "bgp.neighbor-entry" with three indices. The number of indices indicate the number of trees in this table, which allows faster lookup. Each index also includes a key, which can be an array of composite keys. For example, the key can include a combination of one or more keys associated with a tree for faster lookup. In addition the table may have more than one trees for faster lookup. In addition to the aspects shown in FIG. 2, the JSON file table may also implicitly include a sequence tree for book keeping. In some embodiments, the sequence tree key can be a monotonically increasing 64-bit number. This sequence per object for a table ensures there are no stale entries in the system. In some embodiments, the JSON table also can define table special properties, such as whether Diff map is enabled or disabled, and Queue runner and its attributes. The table shown in FIG. 2 defines Diff map properties of a table. For example, the table defines that the Diff map is enabled, and specifies storing no more than one Diff map per object.

Objects Representation

Figure 3:
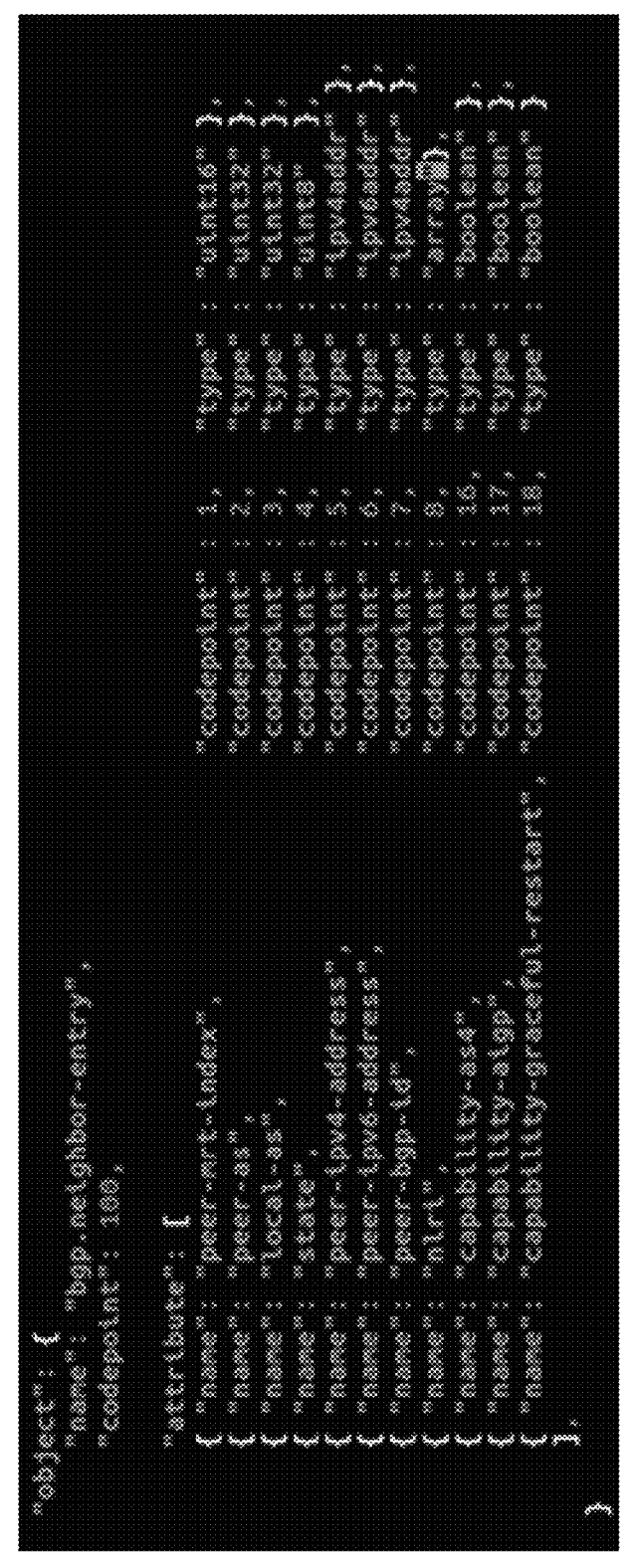

FIG. 3 illustrates one example representation of objects in a BDS system. In particular, FIG. 3 shows an example representation of the object "bgp-neighbor-entry." As shown in FIG. 3, the BGP neighbor can include eleven attributes with different code points. In some embodiments, an object can include up to about 256 code points. In some embodiments, the number of code points can be based on a mask length available in BDS format. The object definition in the JSON can define an object with its attributes and type of each attribute. For example the object definition can include a standard C-type or an object itself. In addition, types such as "array" can include a sub-type which also can be a standard C-type or an object.

D. BDS System Memory Format

FIG. 4 shows an example BDS system memory format. In particular, the BDS system keeps a clear distinction between object-map, object content and index as show in FIG. 4. Object content and map can be stored in the same memory location and index can be stored in a different memory location. This allows reallocating the data without any application interaction, a particularly useful attribute for memory managers seeking data locality for e.g. exploiting warm caches. In some embodiments, the object content can be stored using a serial byte-string with no padding. Each of the object attributes can be stored in network byte order one after another. The object map is a combination of attribute mask and offset list to locate a particular attribute. For example, an attribute code point 0 can be the first offset, code point 1 the second offset, and so on. The width of the offset entry can be variable (1 or 2 octets). This is encoded using the S bit in the header, allowing small and large offsets to be expressed. For most practical reasons only one byte offsets are encoded as the system has large number of small objects.

The BDS system stores the memory format in an in-memory storage systems that include a memory coupled to a processor. For example, the in-system memory can implemented using memory 122 and processor 121 discussed above in relation to FIGS. 1A-1D. The object and the object map can be stored in a location in memory using the memory format shown in FIG. 4. The index map of indexes to the one or more objects can be stored at a separate location in memory using the index map format discussed further below.

As shown in FIG. 4, the memory format can include several fields. Each of these fields is discussed in detail below.

The "Length" field includes the length, in bits, of the entire object map including length field. In case the memory formats ever have to get upgraded in order to support larger message sizes then the container protocol will indicate a different payload format. In some embodiments, the Length field can be about 16 bits long.

The "Type" field can include an object code point. As shown in example for BGP neighbor entry in FIG. 3, the object type or code point is 100. In some embodiments, the Type field can be about 16 bits long.

The "Sequence number" field can be a monotonically increasing number, which represents a version of the corresponding object. For example, each Table can maintain its own Sequence number space. In some embodiments, the Sequence number can be about 64 bits long.

The "Offset count" field denotes the number of offsets in the corresponding object. In some embodiments, the Offset count can be about 8 bits long.

The "S" field can indicate whether the offset is 1 byte or 2 bytes long. If the offset size more than 256 then S bit will be set. In some embodiments, the "S" field can be 1 bit long.

The "U" field indicates whether the data content is an update. If this bit is not set then this object is marked as deleted. Deleted object will be kept in memory for some time until the deleted state has been propagated to all subscribers of a given object. It will be removed during garbage-collection (GC) or when originator knows when entire system is in sync for this object. In some embodiments, the U field can be 1 bit long.

The "D" field indicates whether this object map is a diff map. A diff maps allows keeping more than one version of an object and only encoding the differences between them. In some embodiments, the D field can be 1 bit long.

The "AML" field indicates an attribute mask length. In particular, the AML field represents the number of bytes of attribute mask included in the object map. In some embodiments, the AML field can be about 5 bits long.

The "Attribute mask" field is a bit-vector that describes the encoded attributes of an object definition. For example, a rib-entry object definition may contain 30+ attributes. Depending on the context of object instantiation only a subset of the attributes may get encoded. An external BGP update contains different attributes than an internal BGP update. Every set bit of the Attribute Mask field indicates whether an attribute corresponding to the bit position has been encoded. For example, for an Attribute mask field represented by the word "11000110" bit #0, #1, #5, and #6 are set (starting from the left). This means attribute #0 is pointed to by the first offset, attribute #1 is pointed to by the second offset, attribute #5 is pointed to by the third offset and attribute #6 is pointed to by the fourth.

The "Offset list" field, as discussed above, aids in pointing to the data in the object content. The offset list can also indicate the length of the data content. In some embodiments, the offset list can be of variable length.

The "Data list" field represents the actual data content. In some embodiments, the offset list can be of variable length.

FIG. 5 illustrates an example Array Object Format defined by the BDS system. The Array Object Format includes fields such as "Length," "Type," "S," "Offset list," and "Data list," which are similar to the corresponding fields discussed above in relation to the BDS system memory format shown in FIG. 4. The Array Object Format also includes an "Element" field, which specifies the number of elements within the array defined by the array object format. In some embodiments, the number of elements can be fixed, while in some other embodiments, the number of elements can be variable.

E. Tables and Index Mapping

FIG. 6 illustrates one example representation of a tables in a BDS system. The table can be stored in another memory location in the format shown in FIG. 6. In particular, the table representation includes root fields such as "Sequence root" field, a "Root 1" field, and a "Root 2" field, where each of the root fields can represent a search tree. Each table may have more than one tree for faster lookup with composite key across multiple attributes support in it. When a table is created the BDS system can implicitly create a sequence tree. For example, in JSON file the table representation may have been to create two tables with two trees but internally in the BDS system there will be three trees created. The key for sequence tree can be a monotonically increasing sequence number.

Figure 7:
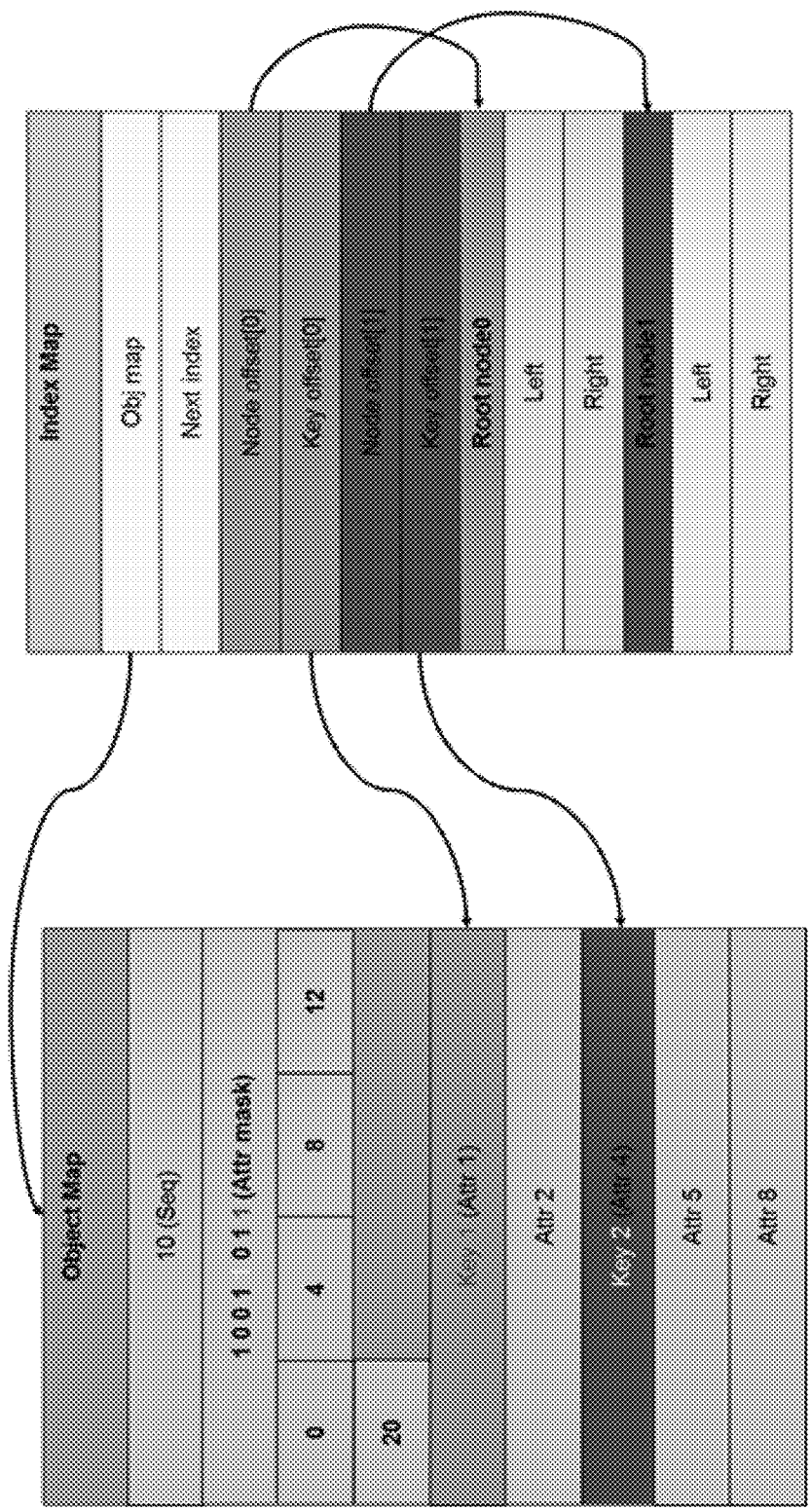
FIG. 7 illustrates one example representation of an index map associated with the table shown in FIG. 6.

FIG. 7 illustrates one example representation of an index map associated with the table shown in FIG. 6. Each tree in table has index map as its node. An index map allows an efficient layout of information in the memory allowing multiple keys for fast lookup operation. The format allows an index map to be attached to various lookup trees while retaining an object in an object map. Building the index separate from the underlying data, allows for batched inserts when the CPU cache is warm, thereby performance efficient. In a memory layout information is retained in hierarchies where in warm cache refers to the characteristic that leverages locality of reference of information to perform a specific lookup quickly. The table format stores at least one node including an index map.

An index map ensures that objects are available for fast lookup in the table and have a pointer to the object map. Further, an index map can include a key and a node offset list for each tree or node in the table. For example, the index map shown in FIG. 6 includes key and node offsets corresponding to two trees "Root 1" and "Root 2" in the table shown in FIG. 6. A "key offset" field includes the offset in the object map for the key. This could be either a single key or an array of keys in case of composite keys. The "Node offset" field includes an offset in the index map for node of a tree. For example, if root node-0 is a radix tree then it would have its own book keeping structure that would be stored in index map and its offset is set. Each node in the tree is pointing to next index map. For example, radix node's left or right will be pointing to next index map and not to radix node itself. In some embodiments, in an index map all the nodes are on the same memory page. This arrangement can ensure that all the indexes are in the warm cache and aids in faster lookup. Separating the key from the data allows the key to be indexed separately.

Figure 8:
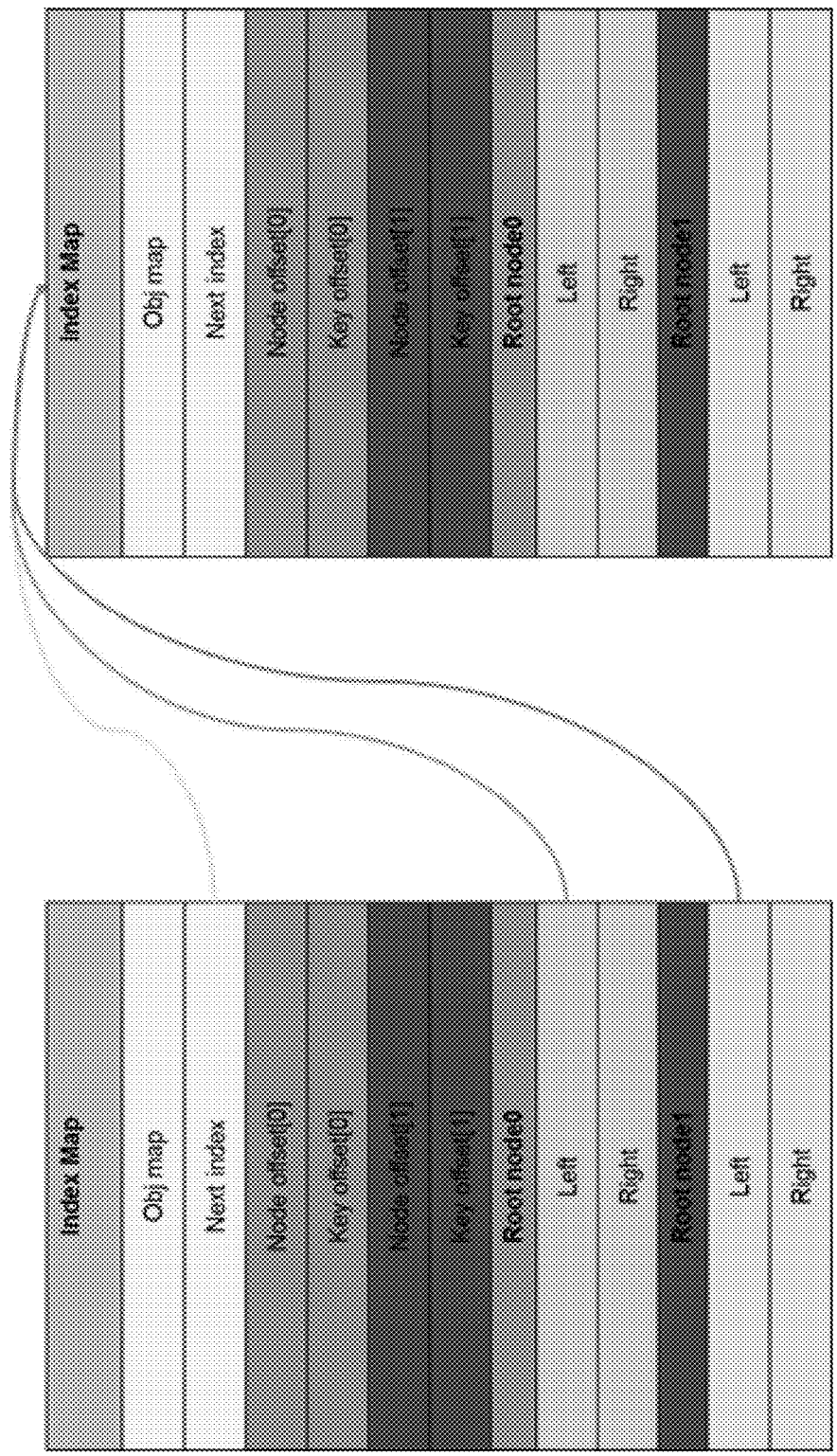
FIG. 8 illustrates one example representation of an index map pointing to another index map in a BDS system.

FIG. 8 illustrates one example representation of an index map pointing to another index map in a BDS system. In particular, an index map can include a next pointer that points to next index map which will be holding diff map as object. The next pointer will only be set if there is a diff map, otherwise it is set to NULL. An index map may point to another index map for tree traversal as discussed above. Tree nodes in the index map can point to next index map for tree traversal.

In some embodiments, entries can be inserted into a table such as the one shown in FIG. 6. In particular, an object-update method can create or update an existing object representing the table. The sequence attribute "S" will be automatically generated by the BDS system, where "S" represents a transaction-number for a table. Each add/change/delete transaction will manipulate the sequence number of its objects. It allows two components to quickly track if they have the same version of a given object. In some embodiments, the sequence number can be a monotonically increasing 64-bit entity, which can be sufficient to avoid sequence-number wraps. However, in case wraps do occur, owing to, for example, a faulty component, then all components having a replica of the respective table need to be restarted with sequence number #1. This procedure is similar to Link-State routing protocols when approaching end-of-sequence space.

F. BDS System Utilities

The BDS system provides a set of utilities for managing the BDSF objects, tables, and attributes discussed above. In particular, the BDS system utilities can manage multiple versions of a given object by using a differential encoding for smaller footprints called as diff maps, can manage snapshot views of tables, provide a queue runner for easily computing workload for a processing job, provide table adds/updates/deletes notifications through plugins, and implement table synchronization protocols. The BDS system provides several utilities such as Diff map, Queue runner, Table plugins, and Table synchronization protocols, each one of which is discussed in detail below.

Diff-Map Utility

Diff-maps enable handing of incremental updates for objects in the BDS system database without increasing memory footprint. Diff-maps allows getting a snapshot of objects, such as a table, at different points in time. Apart from retaining a snapshot, diff-maps can enable debugging and tracking of the state associated with a specific table. In some embodiments, diff-map can be a Last In First Out (LIFO) view of the object where a new object is added at the start followed by linked list of diff-maps each representing a change in the object. In some embodiments, the diff map associated with an object map can be stored in a memory location that is separate from the memory locations of the object map, the object, or the index map associated with the object.

Figure 9:
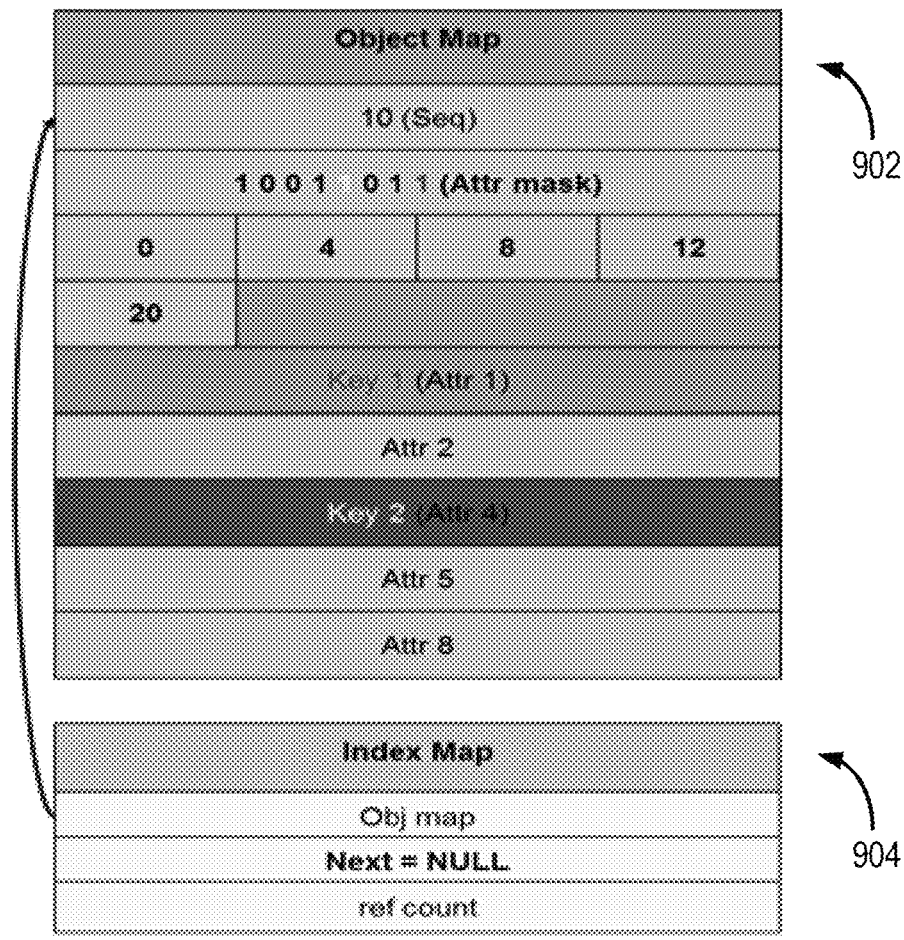
FIGS. 9-13 illustrate various example object maps, index maps, and diff-maps utilized in a in a BDS system.
Figure 10:
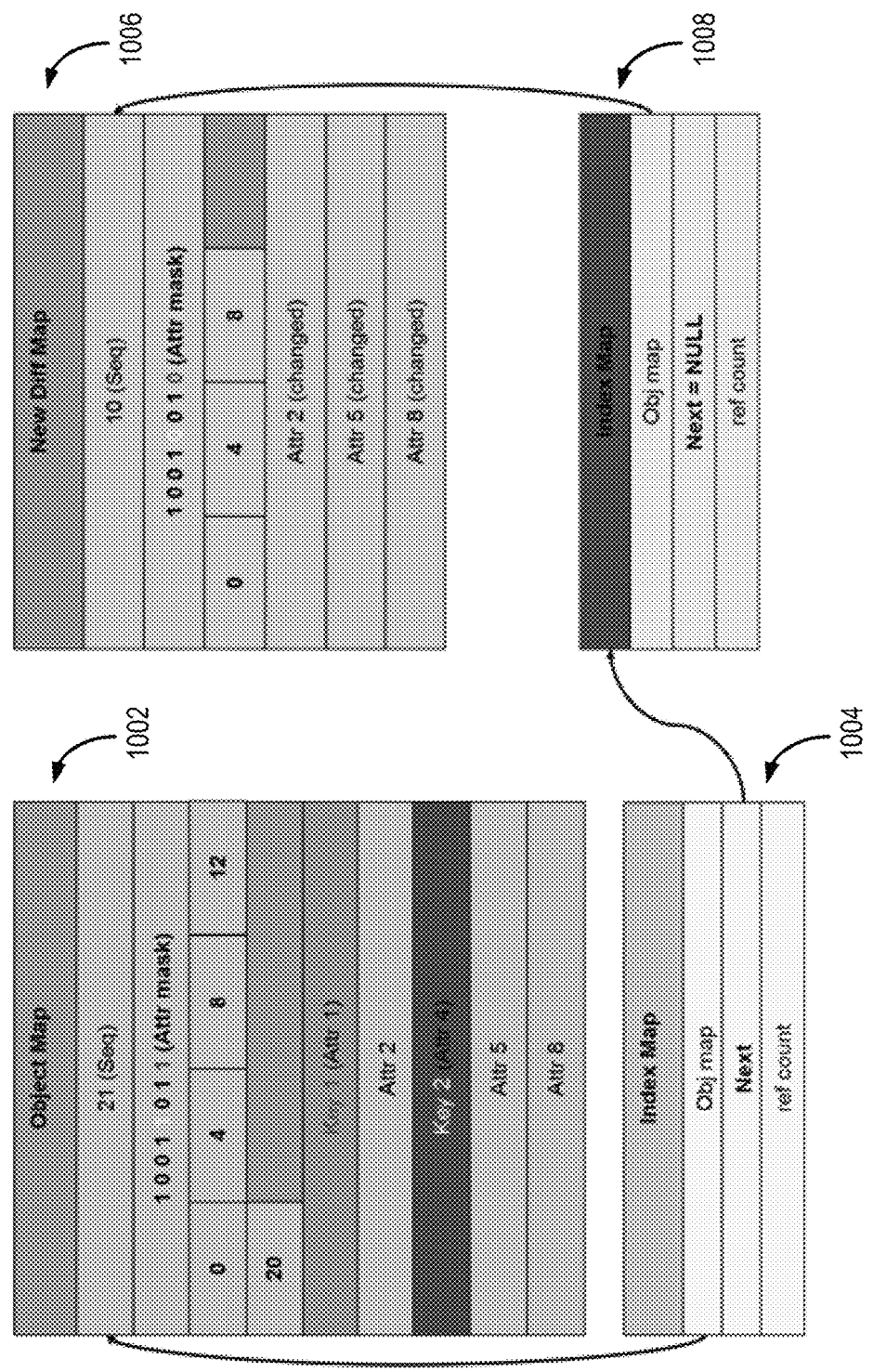
Figure 11:
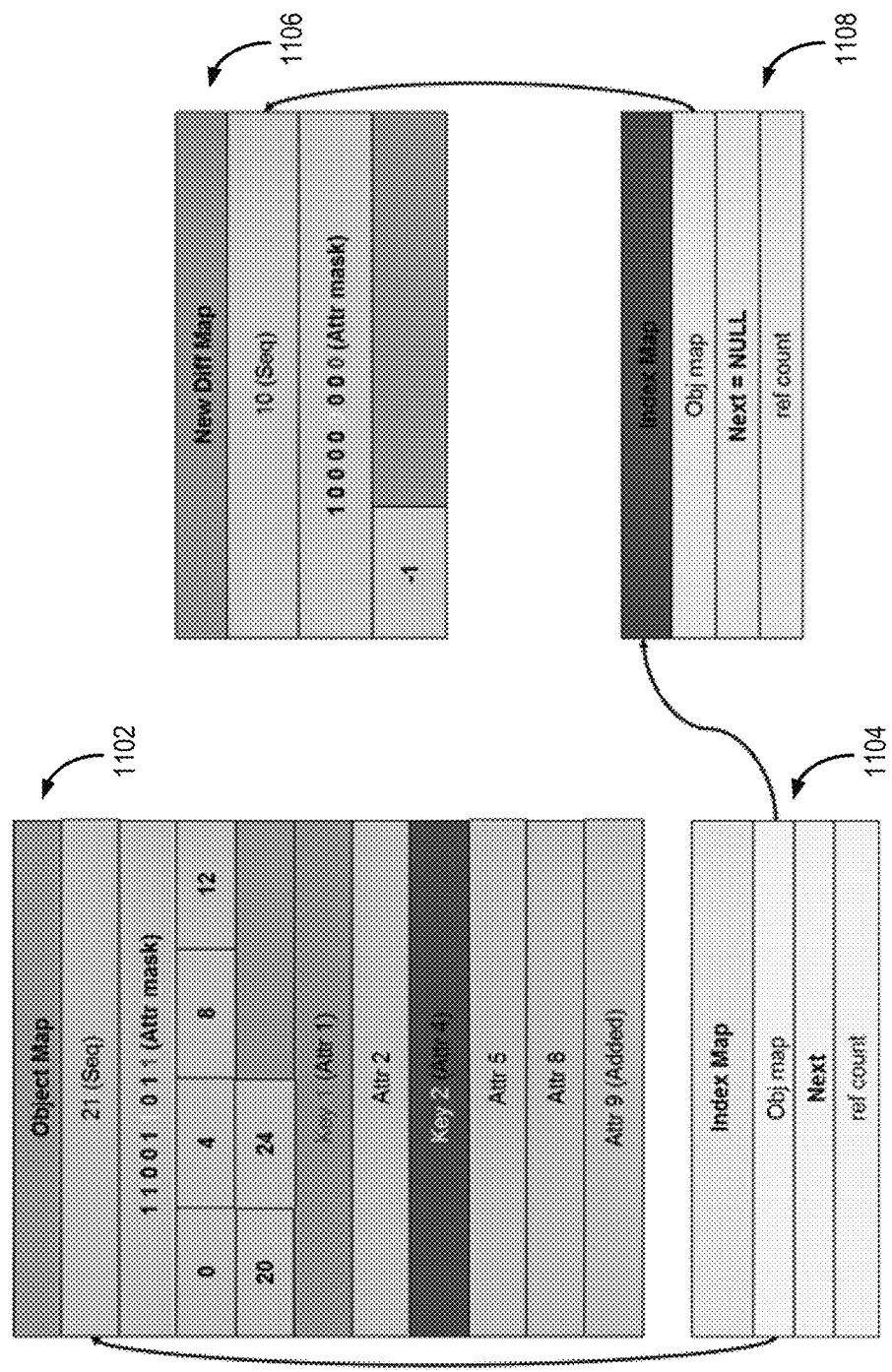
Figure 12:
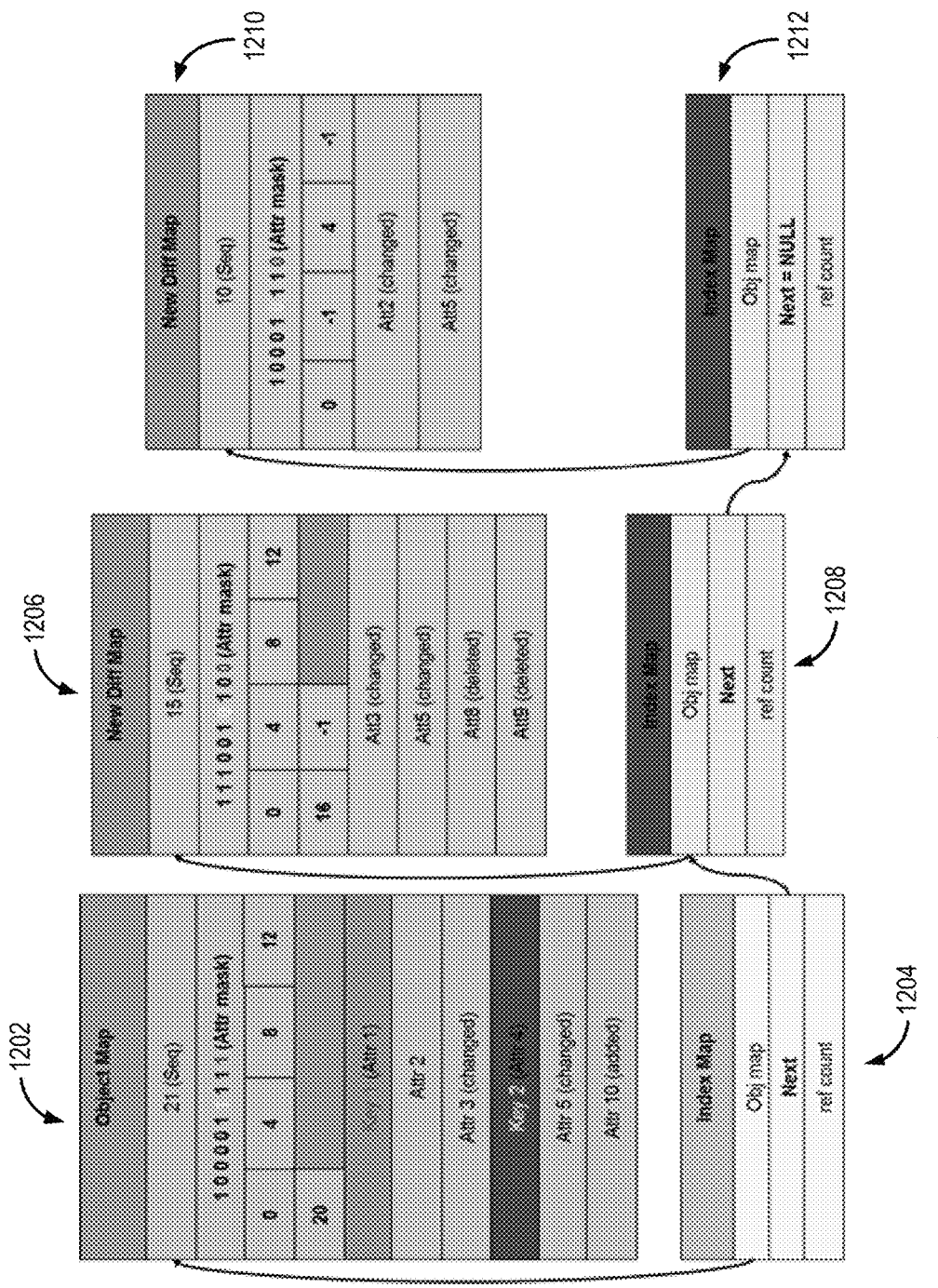
Figure 13:
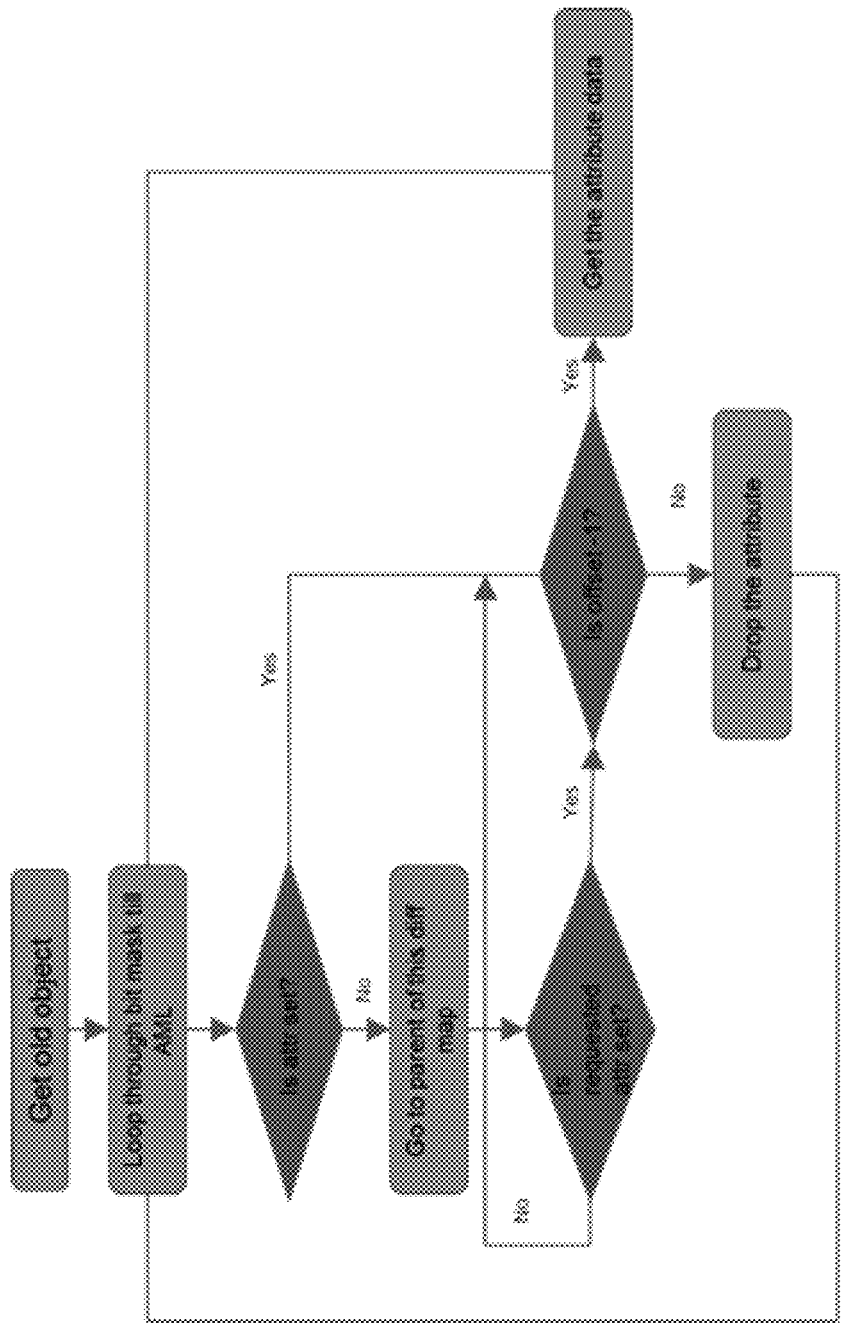

FIGS. 9-13 illustrate various example object maps, index maps, and diff-maps utilized in a in the BDS system. In particular, FIG. 9 shows a base object map and the corresponding base index map; FIG. 10 illustrates an object map with a changed attributes and corresponding index map, in addition to the resulting diff-map and its corresponding diff map index map; FIG. 11 illustrates an object map with a new entry and corresponding index map, in addition to the resulting diff map and its corresponding diff map index map; FIG. 12 illustrates a snapshot of changes to an object map with diff-maps and corresponding index maps representing each change; and FIG. 13 illustrates an example flow diagram that can be utilized to regenerate an object from diff-maps.

As mentioned above, FIG. 9 shows a base object map 902 and the corresponding index map 904. The based object map 902 represents a table having two trees, a sequence number (10) an attribute mask ("10011011") read from right to left, an offset list, and attribute data. All attributes are of fixed length (4 bytes). In addition, attribute 1 and 4 are the keys for tree 1 and tree 2, respectively. For simplicity, many fields of the object map and index map are not shown.

FIG. 10 illustrates an object map with a changed attribute and corresponding index map, in addition to the resulting diff-map and its corresponding index map. In particular, FIG. 10 shows changes to an object map, such as the object map 902 shown in FIG. 9, where the changes include changes to attributes 2, 5, and 8, while the keys remain unchanged. The resulting object map is shown as object map 1002 with corresponding index map 1004. In addition, FIG. 10 shows the resulting diff-map 1006 and the corresponding diff map index map 1008.

The change in the attributes causes the change in the sequence number of the object map from 10 (shown in FIG. 9) to 21. When an attribute is changed, only the changed attribute is reflected in the diff-map 1006. When a complete old object (e.g., 902 in FIG. 9) is requested, the old object can be obtained by collapsing the diff-map 1006 with the latest object map 1002.

FIG. 11 illustrates an altered object map 1102 with a new entry and corresponding index map 1104, in addition to the resulting diff-map 1106 and its corresponding diff-map index map 1108. In particular, the object map 1002 shows a new attribute with respect to the base object map 902 shown in FIG. 9. The new attribute is represented by the addition of a "1" to the left of the attribute mask, corresponding to Attribute 9, resulting in a new attribute mask "110011011." The addition of the attribute also results in addition of new "Att 9" and a corresponding new offset "24". The resulting diff-map 1106 includes a "−1" indicating that the corresponding newly added attribute is to be ignored, or removed, when collapsing the diff-map 1106 and the object map 1102 to obtain the original object map 902.

FIG. 12 illustrates a snapshot of changes to an object map with diff-maps and corresponding index maps representing each change. In particular, FIG. 12 shows an object map 1202 (with sequence number 21) and the corresponding index map 1204 representing the latest state of the object map. Diff-map 1206 (and the corresponding index map 1208) represents the previous instance of the object map, while the diff-map 1210 (and the corresponding index map 1212) represents the oldest instance of the object map. Thus, the snapshot can retain previous states of the system while maintaining a temporal ordering among snapshot instances. In some embodiments, an unlimited number of states can be maintained. In some embodiments, since memory space could be a constraint, portions of the snapshot could be stored in higher tier storage medium (e.g., SDD/HDD storage). FIG. 13 illustrates flow diagram of an example process for regenerating an object from diff-maps.

Diff-Maps and Trees

Figure 14:
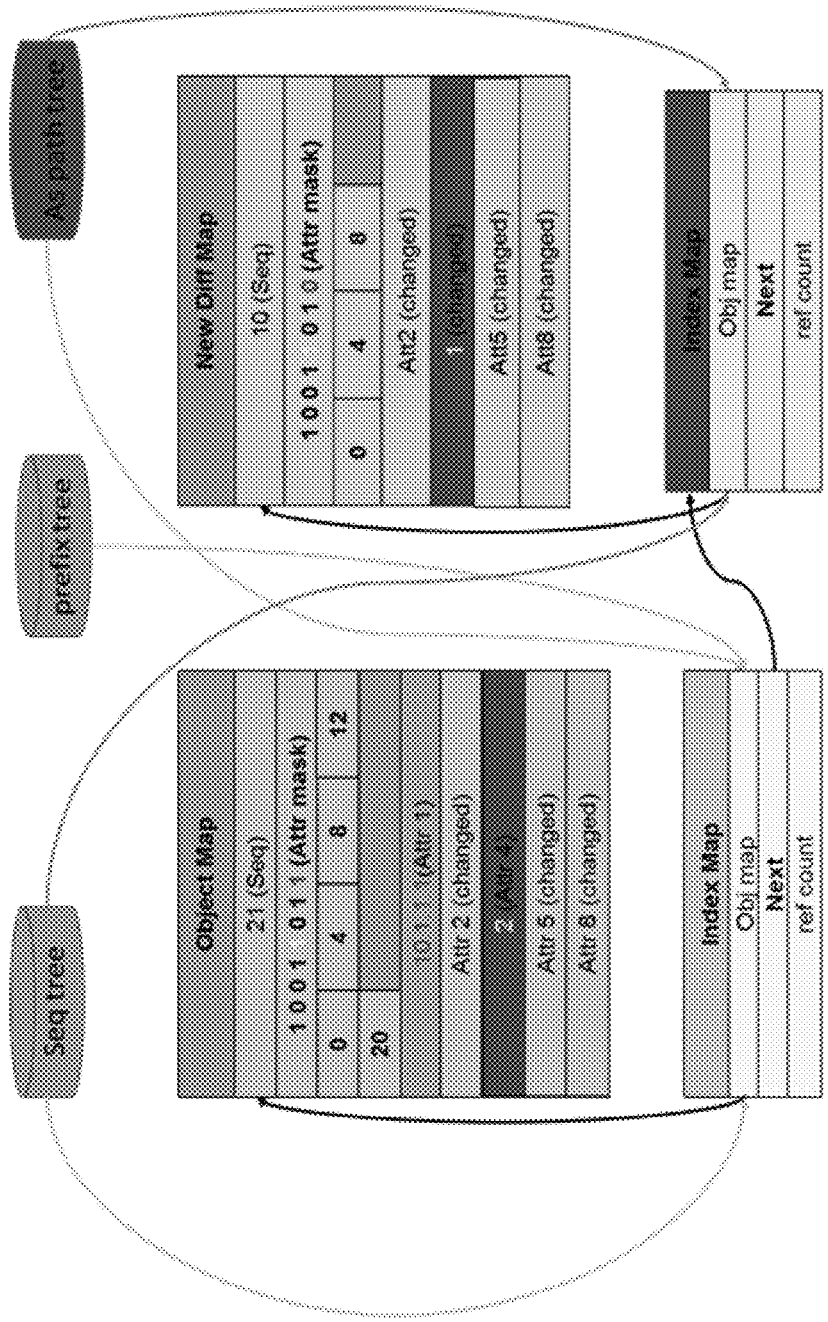
FIG. 14 illustrates an example changed object map and the resulting diff-map in relation to sequence, prefix, and AS-path trees in a BDS system.

FIG. 14 illustrates an example changed object map and the resulting diff-map in relation to sequence, prefix, and AS-path trees in a BDS system. In particular, diff-maps remain a part of sequence tree and also for trees for which a key has changed even after a new object is added to a table. For example, as shown in FIG. 14, an AS-path key is changed in addition to changes in other attributes. If the old object sequence number was 10, and the new object sequence number is 21, then the trees will have a single full map attached with the diff map. Only the sequence tree and the AS-path tree will be pointing to diff-map with old sequence number and the old AS-path. This helps in faster lookup of diff-map objects. On the other hand, the prefix tree will have only one instance of the index and object map attached to it. The diff-map in this tree can only be accessed by index map next pointer.

Queue Runner

A queue runner is a construct that can be used for determining workloads within the BDS system. In some embodiments, the queue runner can be used for example periodic HELLO generation, Prefix notification & redistribution as well as flooding I/O for a given protocol within the network. In some embodiments, a table can be specified to act as a queue runner using JSON.

Figure 15:
FIG. 15 shows an example IS-IS HELLO packet representation in a BDS system.

FIG. 15 shows an example IS-IS HELLO packet, where the IS-IS protocol can add an object to a table and specify an expiration time at which the object should be called with a plugin. The queue runner object can specify several properties such as "Type," "Quantum," "Interval," and "Index and interval attribute." The Type attribute is a FIFO (first-in-first-out) or a TIMER. In case the Type attribute is a FIFO object, the HELLO object will be removed upon expiry. However, in case the Type attribute is a TIMER, the HELLO object can be called periodically at each expiry until it is removed. The Quantum attribute indicates the number of objects, which may have expired at the same time, need to be called with the plugin. The Interval attribute represents the queue runner table scan interval. The Index and interval attribute determine where the next expiry time exists.

For periodic queue runners, the BDS system would expect that the next expiry timer to be present in the object. In some embodiments, the expiry timer can be set by applications. The BDS system can then determine whether the expiry timer has expired, and upon such determination call the related plugin indicating that the timer has expired. Thus, the BDS system does not have to worry about jitter and instead allow the application to set the timer taking into account any jitter. This ensures that the application is aware of the timer settings, and the BDS system is kept as generic as possible.

Table Plugins

Figure 16:
FIG. 16 shows an example table plugin utilized in a BDS system.

FIG. 16 shows an example table plugin. In particular, the table plugin shown in FIG. 16 is specified in JSON. Table plugins are utilities through which a table can communicate with applications about additions/deletions/changes to the tables. An application can register with the BDS system with a set of plugins such that they provide a "library" name and an application program interface (API) name specified by "symbol." The BDS system can resolve these symbols when it parses the table plugin JSON, such as the one shown in FIG. 16, and attaches these plugins to the table types. All instances of this table type will be associated with these plugins. Any add/delete/change operation on the table will lead to a stored procedure call with the table object as an argument.

Container Format

Figure 17:
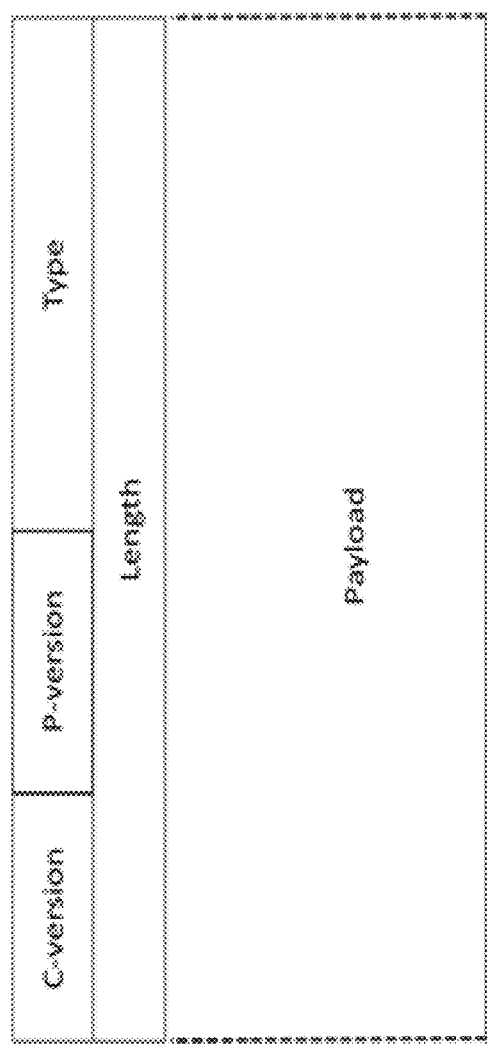
FIG. 17 shows an example container format utilized by the BDS system.

When the BDS system replicates objects, sends table synchronization messages (Complete Sequence Number Update (CSN) & Partial Sequence Number Update (PSN)) or subscribes for updates, it uses a container protocol to encapsulate its messages. FIG. 17 shows an example container format utilized by the BDS system. In particular, the container format includes several fields such as the "C-version" field, "P-version" field, "Type" field, "Length" field, and the "Payload" field. The C-version field specifies the version of the container protocol. The P-version field specifies the version of the payload protocol. The Type field contains the Message Type that is in the payload. The Length field specifies the length of the payload. In some embodiments, the length can be specified in octets, while in some other embodiments, the Length can be specified in bytes. The Payload includes the actual message sent by the BDS system.

Table Synchronization Protocol

Object synchronization of object tables is maintained using a table synchronization protocol. For example, the table synchronization protocol may be used to synchronize routing tables between two IS routers within a network. Considering as an example, a default.bgp.neighbor table has to be replicated from application node-A to application node-B. When a table entry is added when a table-entry is added to a table then an Indexer adds some Index in the index field for quick lookup of the new entry. In some such embodiments, a Neighbor column in a neighbor-entry object can be used as key for a radix tree. In addition, the BDS system assigns to each table entry a unique sequence number to simplify some operations.

In some embodiments, by tracking the last sent sequence number for all receivers of the table, the BDS system can quickly figure out what state needs to be sent. Rather than keeping per-peer verbatim copies of the state that has been sent in the past, the BDS system can track the state with a 64-Bit sequence number embedded in the BGP neighbor data. Therefore, no additional memory is being used when replicating objects to peers. The neighbors will periodically respond with a set of sequence numbers (=Complete Sequence Numbers (CSN) Update) they have seen, such that the sender can retransmit or progress the table walk and send further entries.

In some embodiments, the receiver can send periodic cumulative acknowledgements of a series of received messages. This means that the receiver can acknowledge receipt of multiple messages by sending a single acknowledgement message. For encoding acknowledgments, a technique from IS-IS, called "Partial Sequence Number" (PSN) can be utilized.

In some embodiments, in addition to sending periodic cumulative acknowledgements, the receiver can also send the size of its unprocessed inbound object queue, similar to TCP's receive window advertisements. As a result, if a slow receiver falls behind, it can indicate to the sender to slow down the transmission of messages. The unit of these advertisements can be "number of objects," instead of octets. In some embodiments, an object "send threshold" for each table can be defined at each receiver.

In some embodiments, despite the receiver's best attempts, some objects may get lost in transmission. For example, consider the following table:

| NEIGHBOR | PEER-AS | SEQUENCE # |
| --- | --- | --- |
| 192.168.1.1 | 701 | 11 |
| 192.168.1.3 | 8447 | 13 |

The above table represents the received messages from neighboring nodes with specified IP addresses, AS numbers, and sequence numbers of the messages. Assuming that the message with sequence number 12 is lost. To remedy this, each receiver sends a full set of sequence numbers that it has received. The sending can be repeated at defensive intervals (e.g., 60-180 seconds, depending on the table size). The actual encoding of a CSN is a bit-vector across the entire 64-bit sequence number space. In some embodiments, as the bit-vector for 2^64 bits require storage space of 2^61 bytes, a compression scheme may be employed for encoding the bit-vectors. The BDS system can transmit a consecutive set of bitmap compression codes to describe the acknowledgement bitmap. The acknowledgement bitmap can include a type field and a length field. The type field can be one octet long, for example, and the length field can be of variable length.

In some embodiments, three types of map encoding can be defined by the type field. A "Type-0" encoding can be utilized for communicating all consecutive 0's (a) from the beginning of the sequence number space (e.g., 0x0) to the first sequence number in the table, and (b) from the highest sequence number in the table until the end of sequence number space (e.g., 0xFFFFFFFFFFFFFFFF). This format can be used to encode a set of missing database entries. A "Type-1" encoding can be utilized for communicating all 1's. This format can be used to encode a set of successfully received database entries. A "Type-2" encoding can be utilized for communicating small holes within the bit-map. In case there are small holes, (for example, bit pattern 0x80 and 0xAA) in the sequence number bit-map, it may be more efficient to encode the bit-map itself.

Figure 18:
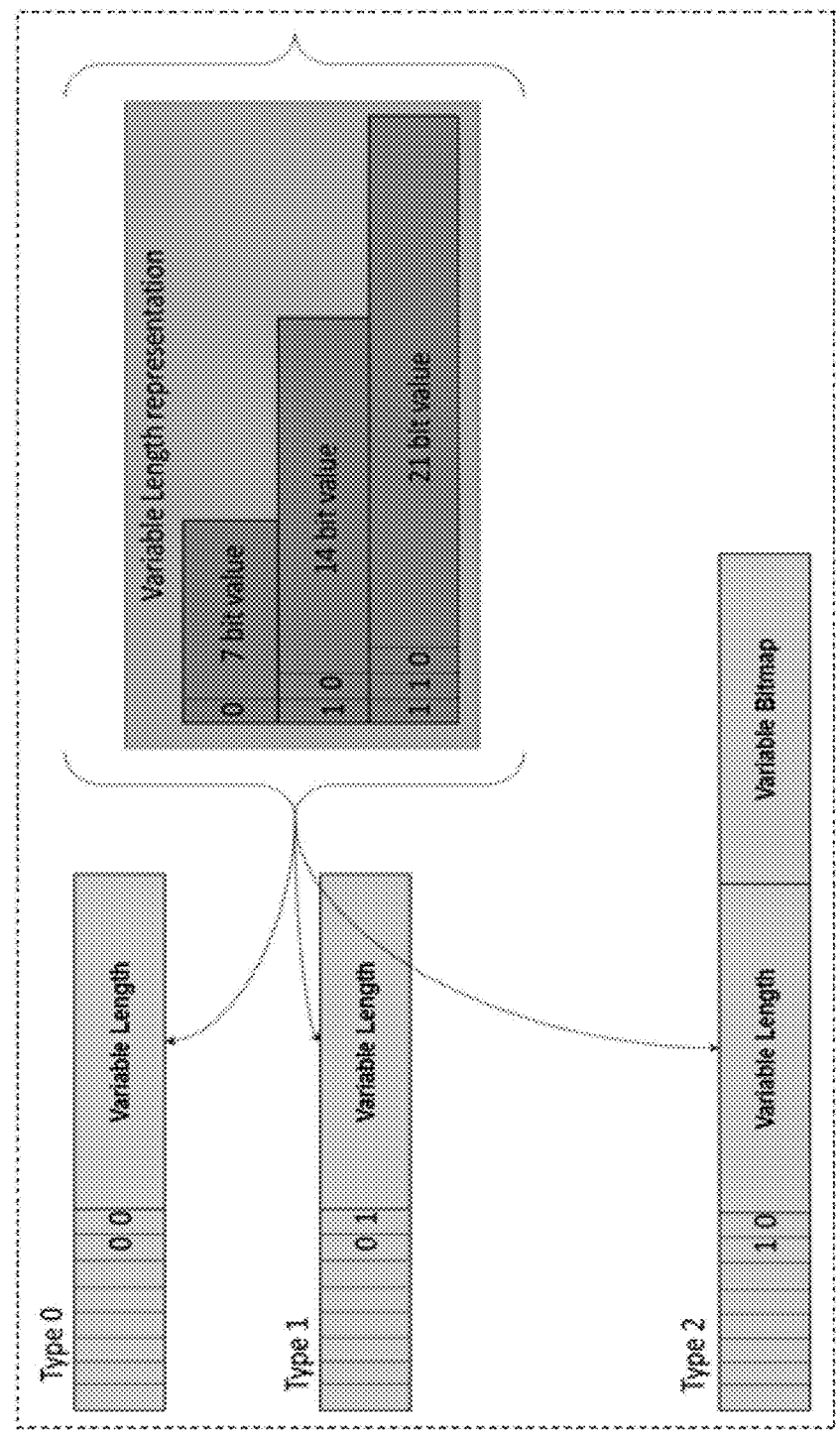
FIG. 18 illustrates example acknowledgement bit-maps using various types and lengths utilized in a BDS system.

FIG. 18 illustrates example acknowledgement bit-maps using various types and lengths. In particular, FIG. 18 show the acknowledge bit map used with the three types discussed above and various Lengths discussed below. In some embodiments, the Length of all compression codes can be encoded using the Protobuf variable length scheme where the MSB indicates whether to load one more octets, the bit after MSB indicates whether to load one more octet, etc. As show in FIG. 18, a value of MSB 0 indicates variable length is 7 bits and value of 10 in MSB indicates variable length is 14-bit value. The length fields describe the number of bits expressed in quantities of octets. A length value of 1 means 8 zero-bits, a value of 2 means 16 zero-bits, etc.

What is claimed is:

1. A system for more efficiently storing objects in memory of an in-memory storage system, the system comprising:
    an in-memory storage system comprising memory coupled to a processor;
    a first location of memory having a first predetermined memory format configured to store content of an object and an object map, wherein the object map comprises an attribute mask and an offset list to locate a particular attribute of a plurality of attributes of the object, wherein the attribute mask comprises a bit vector describing an encoding of the plurality of attributes of the object; and
    a second location of memory having a second predetermined memory format configured to store an index map of indexes to one or more objects; and
    wherein the index map comprises an index to the object map for the object.

2. The system of claim 1, further comprising a table stored in a third location of memory having a third predetermined format.

3. The system of claim 2, wherein the table is further configured to store at least one node comprising the index map.

4. The system of claim 2, wherein the index map comprises a key and offset list for each node in the table.

5. The system of claim 2, wherein the index map is further configured to provide a lookup of the object in the table while maintaining a pointer to the object map.

6. The system of claim 1, wherein the first predetermined memory format is further configured to store a length field identifying a fixed length in bits of the first predetermined memory format.

7. The system of claim 1, wherein the first predetermined memory format is further configured to store one or more of the following fields for one of the object or object map: an attribute mask length indicating a number of bytes of the attribute mask, a sequence number indicating a version of the object, and an offset count indicating a number of offsets in the object.

8. The system of claim 1, wherein data for the object is stored in binary format in the first predetermined memory format.

9. The system of claim 1, further comprising a fourth location of memory having a fourth predetermined format configured to store a diff map associated with the object map, the diff map comprising a diff map attribute mask and a list of attributes, from the plurality of attributes of the object, that have been changed.

10. The system of claim 9, further comprising a fifth location of memory having a fifth predetermined format configured to store diff map index map associated with the diff map, wherein the index map comprises indexes to the diff map.

11. The system of claim 10, wherein the index map of indexes to one or more objects includes an index to the diff map index map.

12. The system of claim 1, wherein the first predetermined memory format and the second predetermined memory format includes a Java Script Object Notation format.

13. The system of claim 1, further comprising a sixth location of memory having a sixth predetermined memory format configured to encapsulate a message to another processor communicably coupled to the processor, the message including information of at least one of: replication of the object and table synchronization.

14. A non-transitory computer readable storage medium having instructions stored thereon, which, when executed by a computer, cause the computer to execute a method for efficiently storing objects in memory of an in-memory storage system, the method comprising:
    storing content of an object and an object map at a first location of memory in an in-memory system in a first predetermined format, wherein the object map comprises an attribute mask and an offset list to locate a particular attribute of a plurality of attributes of the object, wherein the attribute mask comprises a bit vector describing an encoding of the plurality of attributes of the object; and
    storing an index map of indexes to one or more objects at a second location of memory in the in-memory system in a second predetermined memory format, wherein the index map comprises an index to the object map for the object.

15. The non-transitory computer readable storage medium of claim 14, the method further comprising storing a table in a third location of memory in the in-memory system in a third pre-determined format.

16. The non-transitory computer readable storage medium of claim 15, the method further comprising storing at least one node comprising the index map in the table.

17. The non-transitory computer readable storage medium of claim 15, the method further comprising providing a lookup of the object in the table while maintaining a pointer to the object map.

18. The non-transitory computer readable storage medium of claim 14, wherein storing content of an object and an object map at a first location of memory in an in-memory system in a first predetermined format includes storing a length field identifying a fixed length in bits of the first predetermined memory format.

19. The non-transitory computer readable storage medium of claim 14, wherein storing content of an object and an object map at a first location of memory in an in-memory system in a first predetermined format includes storing one or more of the following fields for one of the object or object map: attribute mask length indicating a number of bytes of the attribute mask, a sequence number indicating a version of the object, and an offset count indicating a number of offsets in the object.

20. The non-transitory computer readable storage medium of claim 14, wherein storing content of an object and an object map at a first location of memory in an in-memory system in a first predetermined format includes storing data for the object in binary format.

* * * * *